(12) United States Patent
Kasamatsu (10) Patent No.: US 9,237,247 B2
(45) Date of Patent: Jan. 12, 2016

(54) COMMUNICATION DEVICE, METHOD FOR CONTROLLING THE SAME, AND NON-TRANSITORY COMPUTER READABLE MEDIUM STORING PROGRAM FOR THE SAME

(75) Inventor: Daisuke Kasamatsu, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 233 days.

(21) Appl. No.: 13/547,507

(22) Filed: Jul. 12, 2012

(65) Prior Publication Data

US 2013/0021277 A1 Jan. 24, 2013

(30) Foreign Application Priority Data

Jul. 21, 2011 (JP) .................. 2011-159712

(51) Int. Cl.
*G06F 3/041* (2006.01)
*H04N 1/00* (2006.01)

(52) U.S. Cl.
CPC ....... *H04N 1/00411* (2013.01); *H04N 1/00477* (2013.01)

(58) Field of Classification Search
CPC ......... G06F 3/03; G06F 3/041; G06F 3/0486; G06F 3/1454; H04N 1/00411; H04N 1/00477
USPC .................. 345/156–184; 715/761; 348/744, 348/E15.137
See application file for complete search history.

(56) References Cited

U.S. PATENT DOCUMENTS

| | | | | |
|---|---|---|---|---|
| 5,539,870 A | * | 7/1996 | Conrad et al. | 715/810 |
| 5,748,929 A | * | 5/1998 | Conrad et al. | 715/810 |
| 8,286,098 B2 | * | 10/2012 | Ju | G06F 3/04817 455/414.1 |
| 8,584,043 B2 | * | 11/2013 | Cho | G06F 3/04817 715/814 |
| 8,797,363 B2 | * | 8/2014 | Kim | G06F 3/0416 345/156 |
| 8,924,866 B2 | * | 12/2014 | Shin | H04L 51/04 715/758 |
| 2003/0013483 A1 | * | 1/2003 | Ausems et al. | 455/556 |

(Continued)

FOREIGN PATENT DOCUMENTS

CN 1678010 A 10/2005
CN 102006620 A 4/2011

(Continued)

OTHER PUBLICATIONS

Office Action issued in Chinese Patent Application No. 201210253557.7, mailed Jun. 5, 2014.

(Continued)

*Primary Examiner* — Prabodh M Dharia
(74) *Attorney, Agent, or Firm* — Merchant & Gould PC (57) ABSTRACT

There is provided a communication device including: a touch screen display configured to detect an indicated position and to display a plurality of kinds of object; a controller configured to control the touch screen display to define at least one first area in the touch screen display, control the touch screen display to display a first object in the first area, execute a setting process of communication based on the indicated position in a case that the indicated position detected by the touch screen display is located in the first area; and control the touch screen display to display a second object, which is in relation to data obtained depending on execution or completion of the setting process of communication, in the first area, instead of the first object, in a case that execution of the setting process of communication is completed.

17 Claims, 8 Drawing Sheets

(56) References Cited

U.S. PATENT DOCUMENTS

| | | | |
|---|---|---|---|
| 2004/0103167 A1* | 5/2004 | Grooters et al. | 709/217 |
| 2006/0028398 A1* | 2/2006 | Willmore | 345/2.3 |
| 2007/0162872 A1* | 7/2007 | Hong et al. | 715/828 |
| 2008/0214103 A1* | 9/2008 | Nelson et al. | 455/3.06 |
| 2009/0135149 A1* | 5/2009 | Taniuchi | 345/173 |
| 2009/0164894 A1 | 6/2009 | Takekawa et al. | |
| 2009/0249247 A1 | 10/2009 | Tseng et al. | |
| 2010/0002016 A1* | 1/2010 | Kim | G06F 3/0416 345/660 |
| 2010/0005406 A1* | 1/2010 | Hathaway et al. | 715/764 |
| 2010/0031154 A1 | 2/2010 | Wakabayashi et al. | |
| 2010/0066690 A1* | 3/2010 | Beamish | 345/173 |
| 2010/0090971 A1* | 4/2010 | Choi et al. | 345/173 |
| 2011/0051616 A1 | 3/2011 | Inada et al. | |
| 2011/0096403 A1* | 4/2011 | Cheng et al. | 359/601 |
| 2011/0115880 A1* | 5/2011 | Yoo et al. | 348/42 |
| 2011/0134130 A1* | 6/2011 | Choi | 345/467 |
| 2011/0141119 A1* | 6/2011 | Ito | 345/441 |
| 2011/0148754 A1* | 6/2011 | Inagaki et al. | 345/156 |
| 2011/0161852 A1* | 6/2011 | Vainio et al. | 715/769 |
| 2011/0195739 A1* | 8/2011 | Deleus et al. | 455/518 |
| 2011/0304646 A1* | 12/2011 | Kato | 345/632 |
| 2012/0057205 A1 | 3/2012 | Tashiro | |
| 2012/0122574 A1* | 5/2012 | Fitzpatrick et al. | 463/31 |
| 2012/0194429 A1* | 8/2012 | Kwon et al. | 345/157 |
| 2012/0287069 A1* | 11/2012 | Kim | G06F 3/0416 345/173 |
| 2014/0071069 A1* | 3/2014 | Anderson et al. | 345/173 |
| 2014/0208248 A1* | 7/2014 | Davidson | 715/766 |
| 2014/0316581 A1* | 10/2014 | Fadell et al. | 700/276 |

FOREIGN PATENT DOCUMENTS

| | | |
|---|---|---|
| JP | 2009-152818 A | 7/2009 |
| JP | 2010-206480 A | 9/2010 |
| JP | 2011-516936 A | 5/2011 |

OTHER PUBLICATIONS

Notice of Reasons for Rejection received in related Japanese Patent Application No. 2011-159712, mailed Apr. 6, 2015.

"Wireless LAN connection method (Windows 7)"; http://www.mrl.co.jp/support/Windows_infomation/win7/wlan_setup.htm; Oct. 22, 2009; with partial English translation.

\* cited by examiner

| IMAGE CONTENT | DISPLAY PRIORITY |
|---|---|
| PRINTING HEAD FAILURE ERROR | HIGH |
| PAPER FEEDING MECHANISM FAILURE ERROR | HIGH |
| WIRELESS LAN SETTING BUTTON | MEDIUM |
| RADIO-FIELD STRENGTH DISPLAY | MEDIUM |
| INK REMAINING AMOUNT ERROR | LOW |
| PAPER-OUT ERROR | LOW |

COMMUNICATION DEVICE, METHOD FOR CONTROLLING THE SAME, AND NON-TRANSITORY COMPUTER READABLE MEDIUM STORING PROGRAM FOR THE SAME

CROSS REFERENCE TO RELATED APPLICATION

The present application claims priority from Japanese Patent Application No. 2011-159712, filed on Jul. 21, 2011, the disclosure of which is incorporated herein by reference in its entirety.

BACKGROUND OF THE INVENTION

1. Field of the Invention

The present invention relates to a communication device for displaying various images, a method for controlling the communication device, and a computer readable medium in which a program for the communication device is stored.

2. Description of the Related Art

In order to display a lot of functions on a small operation screen, for example, there is a method for displaying a menu by a tree structure. In the tree structure, in a case that one of button images in a display screen in one level is selected, the display screen is changed to a screen at a next level lower than the one level. On the screen at the next level, a plurality of button images, which are different from said button images, are displayed. A technique is known which does not require any setting operation on the small operation screen in a deep level in the tree structure, which has superior user-friendliness, and by which an intuitively-understandable setting can be made.

In multifunction machines in which multi-functionalization of functions, such as a scanner function, a printer function, a copy function, and a facsimile function, has progressed, a method for displaying settings for a lot of functions on the small operation screen by a deep tree structure has a tendency to increase the number of operations required for displaying a setting for a function to be selected by a user on the screen. Thus, in the method described above, it is difficult to understand where the function to be selected by the user is and which function should be used. That is, the user-friendliness is not good. In the present description, there is provided a technique which can solve such an inconvenience.

SUMMARY OF THE INVENTION

According to the first aspect of the present teaching, there is provided a communication device which is communicatable with an external device, including:

a touch screen display configured to detect an indicated position on the touch screen display and to display a plurality of kinds of object;

a controller configured to:

control the touch screen display to define at least one first area in the touch screen display, control the touch screen display to display a first object in the first area, execute a setting process of communication based on the indicated position in a case that the indicated position detected by the touch screen display is located in the first area; and control the touch screen display to display a second object, which is in relation to data obtained depending on execution or completion of the setting process of communication, in the first area, instead of the first object, in a case that execution of the setting process of communication is completed.

The first object corresponds to a first image which is an image for starting the execution of the predetermined process. The second object corresponds to a data image which is an image displayed in the case that the execution of the setting process of communication is completed. The first image and the data image are images related to each other, but these images do not require to be displayed in the same area such as the first area A1, at the same time. By performing time-division of the first area before and after the completion of the execution of the setting process of communication, the first area can be used as an area in which both of the first and second objects, such as the first image and the data image, can be displayed. By using the time-divided first area, it is possible to reduce bother occurred when the first image or the data image is displayed, such as operation to switch between levels in the tree structure, and thus it is possible to enhance user-friendliness. In the present specification, a phrase "a processing result obtained by the execution of the process is reset" means that a flag which is set when the process is completed is unset. For example, as described below, a wireless LAN setting flag is set when a wireless LAN setting process is completed, and the wireless LAN setting flag is unset when the processing result obtained by the execution of the wireless LAN setting process is reset.

According to the second aspect of the present teaching, there is provided a method for controlling a communication device, the communication device including a touch screen display configured to detect an indicated position on the touch screen display and to display a plurality of kinds of object; and a controller configured to perform a setting process of communication based on the indicated position detected by the touch screen display, the method including:

defining at least one first area in the touch screen display and displaying a first object in the first area;

executing a process in a case that the indicated position detected by the touch screen display is located in the first area;

displaying a second object, which is in relation to data obtained depending on execution or completion of the setting process of communication, in the first area, instead of the first object, in a case that execution of the setting process of communication is completed.

According to the third aspect of the present teaching, there is provided a non-transitory computer readable medium in which a program for a communication device is stored, the communication device including a touch screen display configured to detect an indicated position and to display a plurality of kinds of object, and a controller configured to perform a setting process of communication based on the indicated position detected by the touch screen display, wherein the program is configured so that the controller in the communication device functions as:

a first display control mechanism configured to control the touch screen display to define at least one first area in the touch screen display and to control the touch screen display to display a first object in the first area;

a process executing mechanism configured to execute a setting process of communication in a case that the indicated position detected by the touch screen display is located in the first area; and a second display control mechanism configured to control the touch screen display to display a second object, which is in relation to data obtained depending on execution or completion of the setting process of communication, in the first area, instead of the first object, in a case that execution of the setting process of communication is completed.

DESCRIPTION OF THE PREFERRED EMBODIMENTS

First Embodiment

An explanation will be made about the first embodiment of the present teaching. A printing system 1 includes a Multifunction Peripheral (MFP) 10, an access point 62, and an internet 70.

[Structure of MFP 10]

The MFP 10 is an apparatus having a printer function, a scanner function, a copy function, a facsimile function, a telephone function, and the like. The MFP 10 includes a controller 12, a display panel 50, a hardware key 52, a printing section 54, a scanning section 56, a facsimile section 58, a network interface 60, a wireless transmission and reception section 36, a wireless antenna section 37, etc. The controller 12 includes a CPU 14, a ROM 16, a RAM 30, a NVRAM 40, etc.

Figure 1:
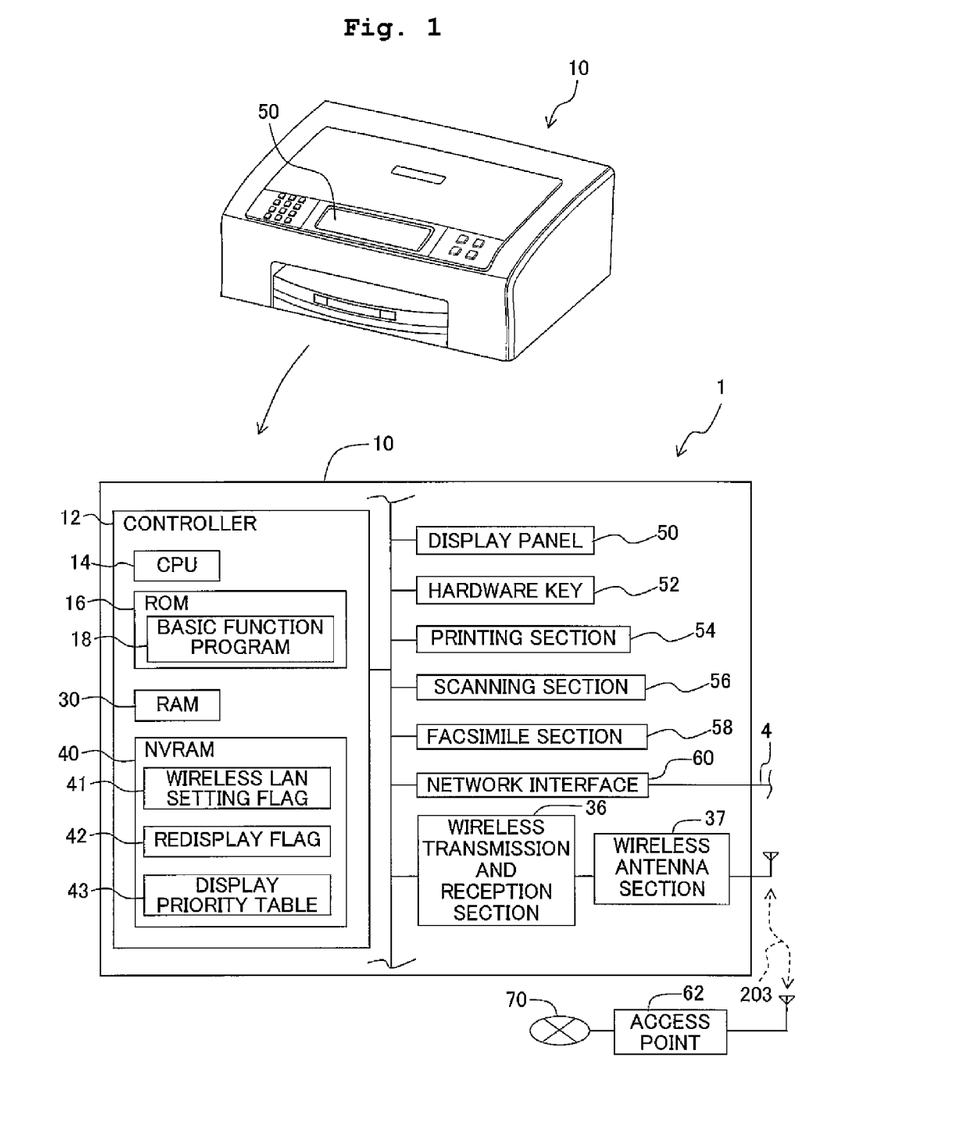
FIG. 1 shows an exterior appearance and a structure of a multifunction machine.
Figure 7:
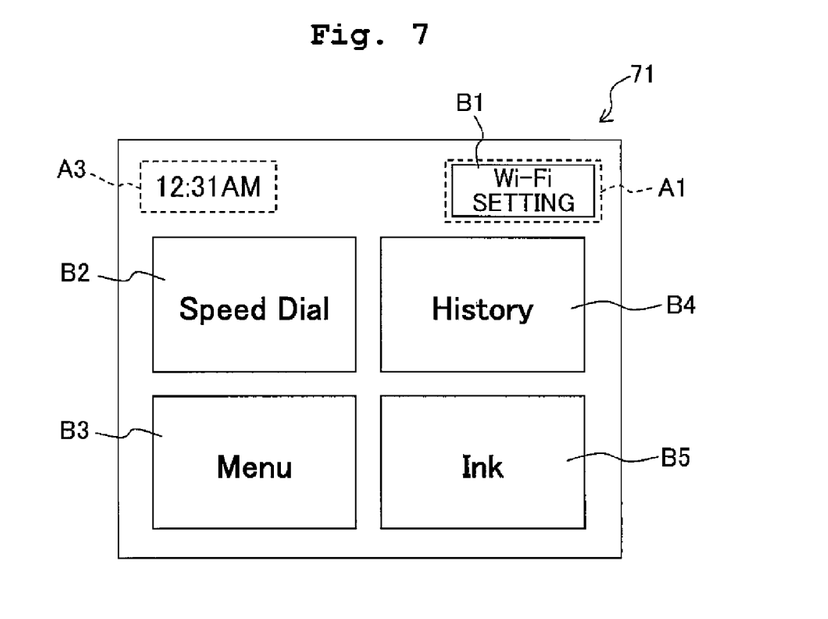
FIG. 7 is the first display example of a display panel.

As shown in FIG. 1, the display panel 50 is provided on an upper-surface of the MFP 10 at the front side thereof. The display panel 50 is a so-called touch panel. The display panel 50 has a function to detect a pointed coordinate, which is inputted so that the finger of a user, a stylus, or a pen for the touch panel makes contact with or makes approach to the display panel 50. The display panel 50 has a function to display various images. A standby screen 71 as shown in FIG. 7 is an example of the uppermost level display screen in a menu display of a tree structure. The tree structure is a structure in which, in a case that one of button images in a display screen in one level is selected, the display screen is changed to a screen at a next lower level and then a plurality of button images, which are different from the button images of the one level, are displayed.

The standby screen 71 has the first area A1. The first area A1 is an area for displaying a wireless LAN setting button B1, a radio-field strength display D1, etc., as will be described later on. In a display example of the display panel 50 shown in FIG. 7, the first area A1 having a rectangular shape is provided at the upper-right corner of the standby screen 71. The wireless LAN setting button B1 is a button image for starting a wireless LAN setting process (S21). The wireless LAN setting includes various settings for making it possible to execute a wireless LAN communication 203. The radio-field strength display D1 is an image which is displayed in a case that the wireless LAN setting process (S21) is completed.

On the standby screen 71 as shown in FIG. 7, various button images, such as a "Speed Dial" button B2, a "Menu" button B3, a "History" button B4, and an "Ink" button B5, are displayed. By touching each of the button images, it is possible to display, on the display panel 50, a screen of a lower level than the standby screen 71. The current time is displayed in the third area A3.

The wireless transmission and reception section 36 of the MFP 10 transmits and receives digital signals forming various types of data by performing the wireless LAN communication 203 with the access points 62 via the wireless antenna section 37. The wireless transmission and reception section 36 is capable of measuring received radio-field strength of a radio wave, which is received by the wireless antenna section 37 and is used in the wireless LAN communication 203. A wireless LAN communication system is exemplified, for example, by a communication system defined in IEEE802.11a/b/g/n standard. The access points 62 are capable of communicating with an external device via the internet 70 or intranet.

The network interface 60 is connected to a wired LAN circuit 4. The MFP 10 is capable of communicating with the access points 62 by using the wired LAN circuit 4, instead of the wireless LAN communication 203.

The CPU 14 executes various processes in accordance with a program stored in the ROM 16. The processes executed by the CPU 14 will be described in detail later on. The RAM 30 is a volatile memory, which is a storage area for storing various types of data generated when the processes are executed in accordance with a basic function program 18. In the ROM 16, the basic function program 18 for controlling a basic function of the MFP 10 is stored.

The NVRAM 40 is a nonvolatile memory and an abbreviation of Non Volatile RAM. In the NVRAM 40, a wireless LAN setting flag 41, a redisplay flag 42, and a display priority table 43 are stored. The wireless LAN setting flag 41 is a flag which indicates as to whether or not the wireless LAN setting is set. The redisplay flag 42 is a flag which indicates as to whether or not the wireless LAN setting button B1 is redisplayed in the first area A1 in a case that the wireless LAN setting is set. The display priority table 43 is a table in which a display priority of image content shown in the first area A1 is defined. The display priorities of the wireless LAN setting button B1 and the radio-field strength display D1 are set as "medium". The display priority of an error display having high urgency, such as a printing head failure error and a paper feeding mechanism failure error, is set as "high", the priority of which is higher than those of the wireless LAN setting button B1 and the radio-field strength display D1. Further, the display priority of an error display having low urgency, such as an ink remaining amount error and a paper-out error, is set as "low", the priority of which is lower than those of the wireless LAN setting button B1 and the radio-field strength display D1.

Further, various settings are stored in the NVRAM 40. The settings stored in the NVRAM 40 include a predetermined time (S20), a radio-field strength threshold (S20, S41), etc. These settings can be set by the user in advance.

Figure 2:
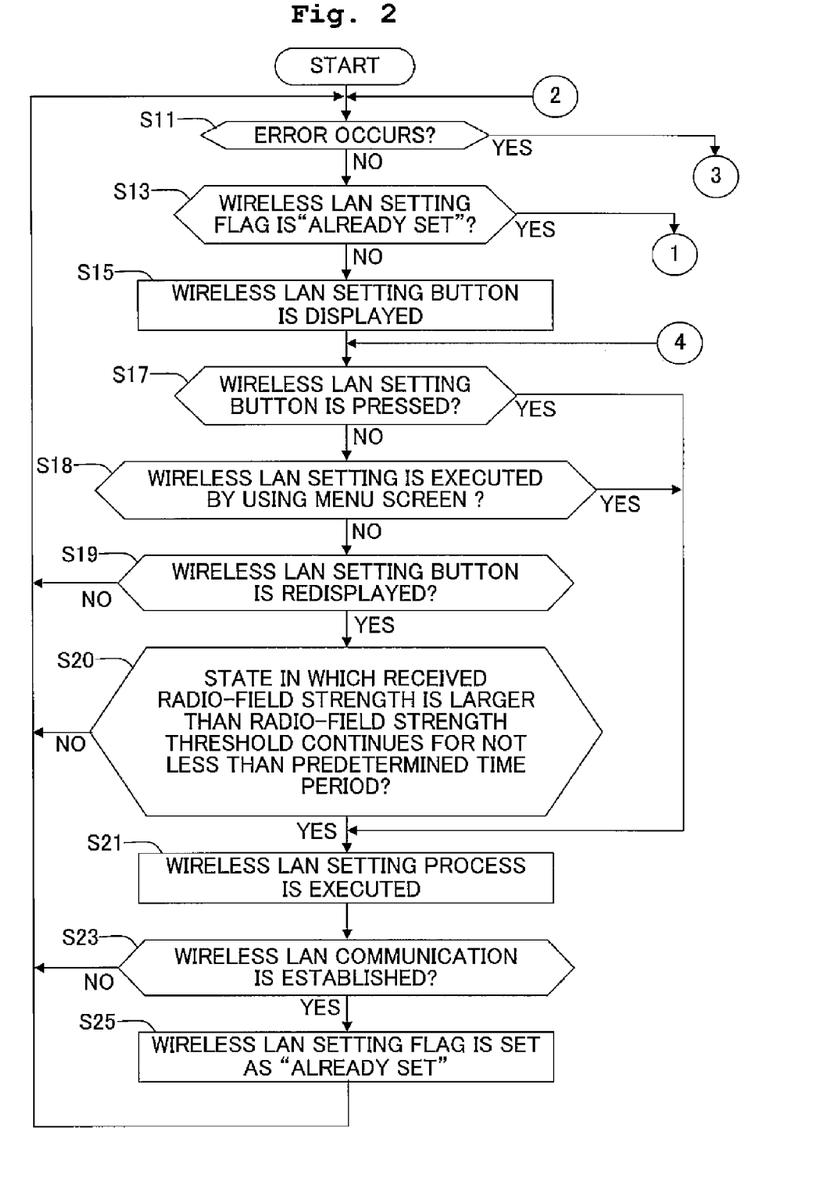
FIG. 2 is the first flowchart showing operation of the multifunction machine.
Figure 3:
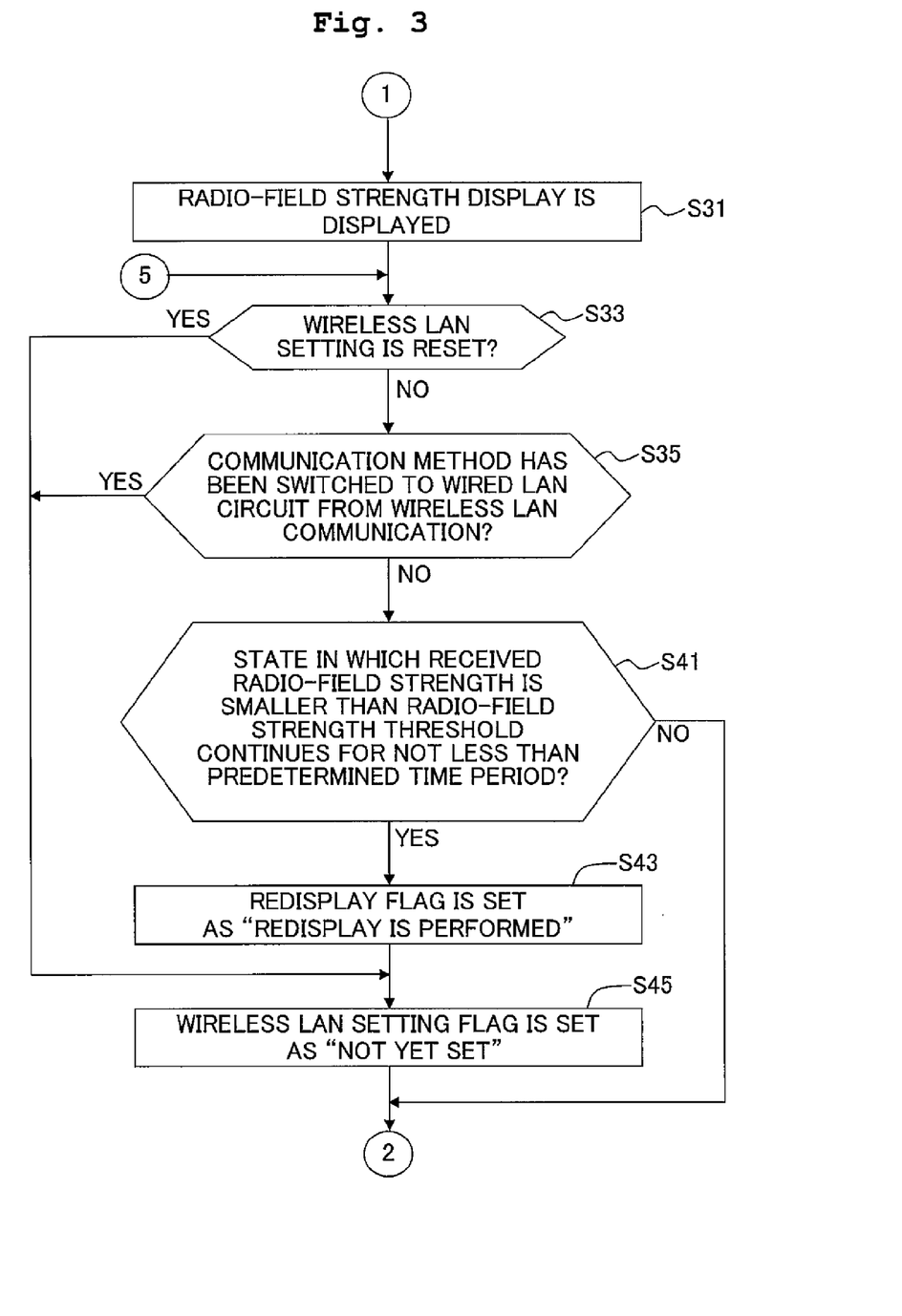
FIG. 3 is the second flowchart showing the operation of the multifunction machine.
Figure 4:
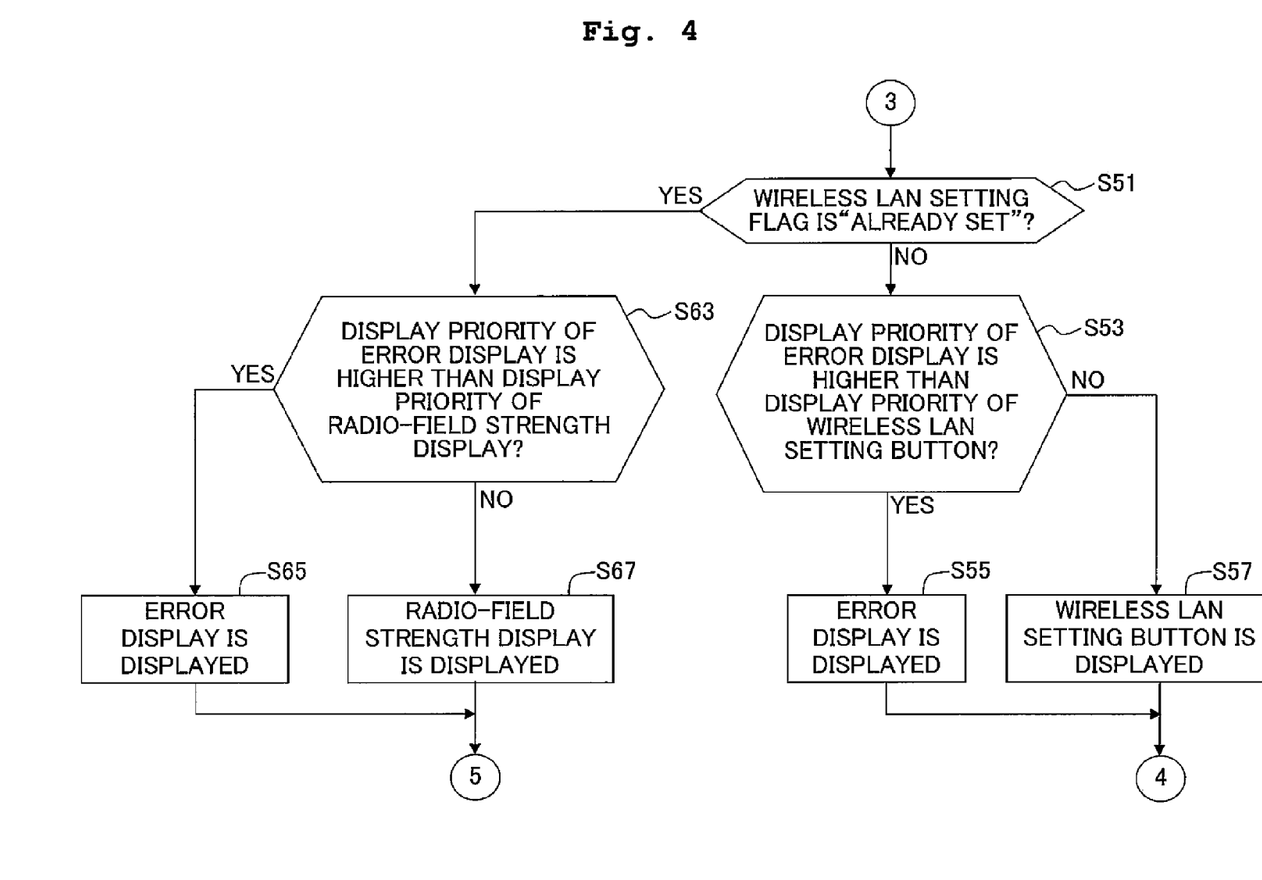
FIG. 4 is the third flowchart showing the operation of the multifunction machine.

An explanation will be made with reference to flowcharts of FIG. 2 to FIG. 4 about the operation of the MFP 10 according to the first embodiment. The flow of FIG. 2 to FIG. 4 starts when the MFP 10 is powered on, and is continued until the MFP 10 is powered off. In a step S11, the CPU 14 judges as to whether or not an error, which is required to be displayed as the error display, occurs in the MFP 10. In a case that the error does not occur (S11: NO), the process proceeds to a step S13. In the step S13, the CPU 14 judges as to whether or not the wireless LAN setting flag 41 stored in the NVRAM 40 is "already set". In a case that the wireless LAN setting flag 41 is "not yet set" (S13: NO), the CPU 14 judges that the wireless LAN setting process is not yet performed. Then, the process proceeds to a step S15.

In the step S15, the CPU 14 controls the display panel 50 to display the wireless LAN setting button B1 in the first area A1 of the standby screen 71. By doing so, as shown in FIG. 7, the wireless LAN setting button B1 is displayed at the upper-right corner of the standby screen 71.

In a step S17, the CPU 14 judges as to whether or not the wireless LAN setting button B1 is pressed. In particular, the CPU 14 judges as to whether or not a coordinate of a pressed position on the display panel 50 can be obtained. In a case that the coordinate of the pressed position can be obtained, the CPU 14 judges as to whether or not said obtained coordinate is positioned in the first area A1. In a case that the CPU 14 judges that the wireless LAN setting button B1 is pressed (S17: YES), the process proceeds to a step S21. In a case that the CPU 14 judges that the wireless LAN setting button B1 is not pressed (S17: NO), the process proceeds to a step S18.

In the step S18, the CPU 14 judges as to whether or not execution of the wireless LAN setting is instructed by using a menu screen which belongs to a lower level of the standby screen 71. The menu screen belonging to the lower level is exemplified by a menu screen, which is displayed after pressing the "Menu" button B3 in the display example of the standby screen 71 as shown in FIG. 7. In a case that the execution of the wireless LAN setting is instructed by using the menu screen which belongs to the lower level (S18: YES), the process proceeds to a step S21. In a case that the execution of the wireless LAN setting is not instructed (S18: NO), the process proceeds to a step S19.

In the step S19, the CPU 14 judges as to whether or not the wireless LAN setting button B1 displayed in the first area A1 is redisplayed. A redisplay of the wireless LAN setting button B1 is a process that the wireless LAN setting button B1 is displayed, instead of the radio-field strength display D1, in the first area A1, in a case that the received radio-field strength of the wireless LAN communication 203 is weak (S41: YES). The judgment in S19 is performed based on whether or not the redisplay flag 42 stored in the NVRAM 40 is set as "redisplay is performed". In a case that the wireless LAN setting button B1 is not redisplayed (S19: NO), the process returns to the step S11. In a case that the wireless LAN setting button B1 is redisplayed (S19: YES), the process proceeds to a step S20.

In the step S20, the CPU 14 judges as to whether or not a state, in which the received radio-field strength of the wireless LAN communication 203 is larger than the radio-field strength threshold, continues for not less than a predetermined time period. In a case that the state does not continue for not less than the predetermined time period (S20: NO), the process returns to the step S11. In a case that the state continues for not less than the predetermined time period (S20: YES), the process proceeds to a step S21.

In the step S21, the CPU 14 executes the wireless LAN setting process. The wireless LAN setting process is exemplified by a wireless LAN setting wizard. The wireless LAN setting wizard is a function in which various setting items required for executing the wireless LAN communication 203 are set simply and interactively.

Proceeding to a step S23, the CPU 14 judges as to whether or not the wireless LAN communication 203 is established. In a case that the wireless LAN communication is not estab-lished (S23; NO), the process returns to the step S11. In a case that the wireless LAN communication is established (S23: YES), the process proceeds to the step S25. In the step S25, the CPU 14 sets the wireless LAN setting flag 41 stored in the NVRAM 40 as "already set". Then, the process returns to the step S11.

In the step S13, in a case that the wireless LAN setting flag 41 is set as "already set" (S13: YES), the CPU 14 judges that the wireless LAN setting process is executed. Then, the process proceeds to a step S31 as shown in FIG. 3. In the step S31, the CPU 14 displays the radio-field strength display D1 in the first area A1 of the standby screen 71. The radio-field strength display D1 displays the received radio-field strength of the radio wave, which is measured by the wireless transmission and reception section 36 and is used in the wireless LAN communication 203, in real time. Further, the CPU 14 sets the redisplay flag 42 stored in the NVRAM 40 as "no redisplay".

In a step S33, the CPU 14 judges as to whether or not setting content of the wireless LAN setting is reset. The reset of the wireless LAN setting is performed, for example, by selecting the reset of wireless LAN setting in the menu screen belonging to the lower level of the standby screen 71. In a case that the wireless LAN setting is reset (S33: YES), the process proceeds to a step S45. In a case that the wireless LAN setting is not reset (S33: NO), the process proceeds to a step S35.

In the step S35, the CPU 14 judges as to whether or not a connection method between the MFP 10 and the access points 62 is switched from the wireless LAN communication 203 to the wired LAN circuit 4. In a case that the connection method is switched to the wired LAN circuit 4 (S35: YES), the process proceeds to the step S45. In a case that the connection method is not switched to the wired LAN circuit 4 (S35: NO), the process proceeds to a step S41.

In a step S41, the CPU 14 judges as to whether or not a state, in which the received radio-field strength of the wireless LAN communication 203 is smaller than the radio-field strength threshold, continues for not less than the predetermined time period. In a case that the state does not continue for not less than the predetermined time period (S41: NO), the process returns to the step S11 (FIG. 2). In the case that the state continues for not less than the predetermined time period (S41: YES), the process proceeds to a step S43. In the step S43, the CPU 14 sets the redisplay flag 42 stored in the NVRAM 40 as "redisplay is performed". Then, the process proceeds to the step S45. In the step S45, the CPU 14 sets the wireless LAN setting flag 41 stored in the NVRAM 40 as "not yet set". Then, the process proceeds to the step S11 as shown in FIG. 2.

Further, in the step S11, in a case that the error, which is required to be displayed as the error display, occurs in the MFP 10 (S11: YES), the process proceeds to a step S51 shown in FIG. 4. In the step S51, the CPU 14 judges as to whether or not the wireless LAN setting flag 41 stored in the NVRAM 40 is set as "already set". In a case that the wireless LAN setting flag 41 is "not yet set" (S51: NO), the process proceeds to a step S53.

Figure 9:
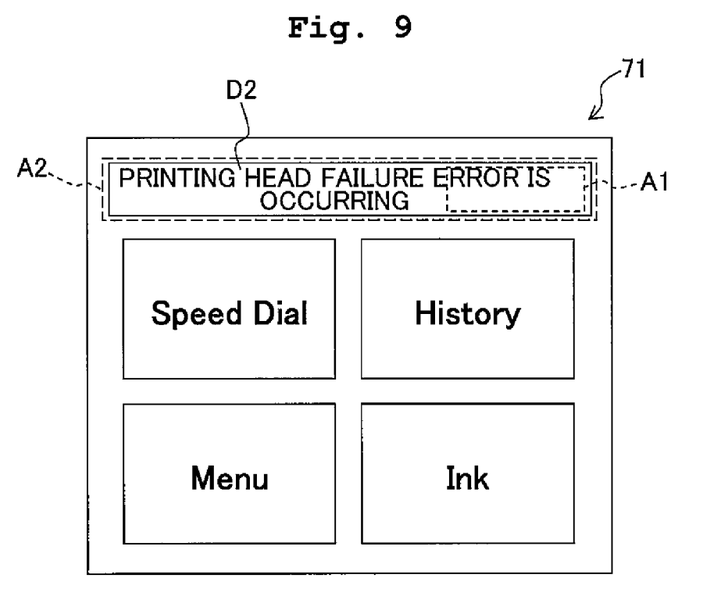
FIG. 9 is the third display example of the display panel.

In the step S53, the CPU 14 judges as to whether or not a display priority of an error display D2 depending on error content occurred in the MFP 10 is higher than the display priority of the wireless LAN setting button B1. This judgment is performed by using the display priority table 43 (FIG. 10) stored in the NARAM 40. In a case that the display priority of the error display D2 is higher than the display priority of the wireless LAN setting button B1 (S53: YES), the CPU 14 judges that the error display D2 should be displayed in preference to the wireless LAN setting button B1. Then, the process proceeds to a step S55. In the step S55, the CPU 14 displays the error display D2 in the second area A2. The second area A2 is an area for displaying the error display D2. As shown in FIG. 9, at least a part of the second area A2 is overlaid with the first area A1. When the error display D2 is displayed in the second area A2, the wireless LAN setting button B1 displayed in the first area A1 is overlaid with the error display D2, and the wireless LAN setting button B1 is hided.

In the step S53, in a case that the display priority of the error display D2 is not higher than the display priority of the wireless LAN setting button B1 (S53: NO), the CPU 14 judges that the wireless LAN setting button B1 should be displayed in preference to the error display D2. Then, the process proceeds to a step S57. In the step S57, the CPU 14 controls the display panel 50 to display the wireless LAN setting button B1 in the first area A1. By doing so, as shown in FIG. 7, the wireless LAN setting button B1 is displayed in the first area A1.

Figure 8:
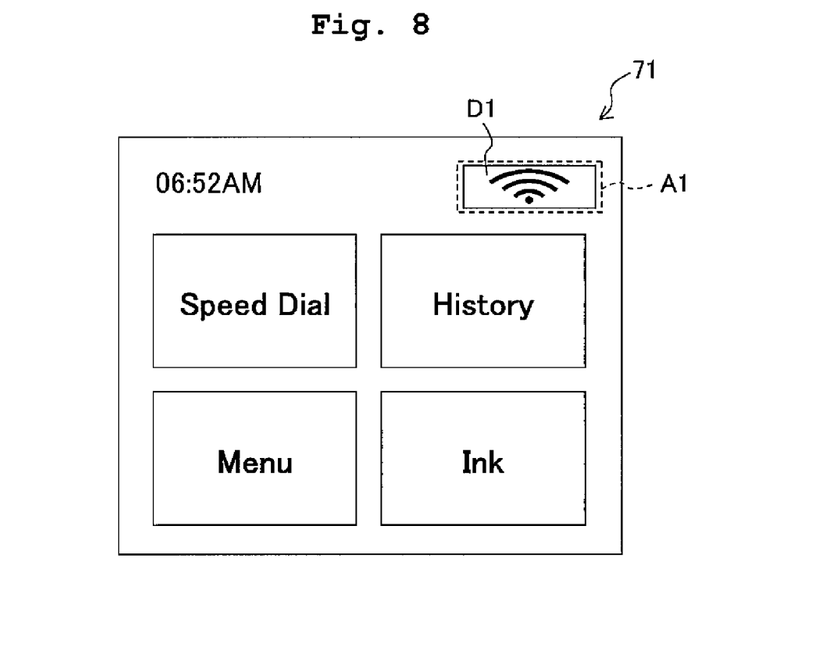
FIG. 8 is the second display example of the display panel.

Further, in the step S51, in a case that the wireless LAN setting flag 41 is set as "already set" (S51: YES), the process proceeds to a step S63. In the step S63, the CPU 14 judges, by using the display priority table 43, as to whether or not the display priority of the error display D2 depending on the error content occurred in the MFP 10 is higher than the display priority of the radio-field strength display D1. In a case that the display priority of the error display D2 is higher than the display priority of the radio-field strength display D1 (S63: YES), the process proceeds to a step S65 and the CPU 14 controls the display panel 50 to display the error display D2 in the second area A2. By doing so, as shown in FIG. 9, the radio-field strength display D1 displayed in the first area A1 is overlaid with the error display D2. On the other hand, in a case that the display priority of the error display D2 is lower than the display priority of the radio-field strength display D1 (S63: NO), the process proceeds to a step S67 and the CPU 14 controls the display panel 50 to display the radio-field strength display D1 in the first area A1. By doing so, as shown in FIG. 8, the radio-field strength display D1 is displayed in the first area A1.

[Explanation of Exemplary Operation of MFP]

An explanation will be made about an exemplary operation of the MFP 10. At first, an explanation will be made about a case in which the wireless LAN setting is set in a state that the wireless LAN setting is not yet set, such as a case in which the wireless LAN setting is set at the time of purchase of the MFP 10. When the flowchart of FIG. 2 is started, since the wireless LAN setting is not set (S13: NO), the wireless LAN setting button B1 as shown in FIG. 7 is displayed in the first area A1 of the standby screen 71 (S15). In the case that it is detected that the wireless LAN setting button B1 is pressed by the user (S17: YES), the wireless LAN setting wizard is started (S21). In the case that the wireless LAN communication 203 is established (S23: YES), the wireless LAN setting flag 41 stored in the NVRAM 40 is set as "already set" (S25). Then, the process returns to the step S11.

Since the wireless LAN setting is already set (S13: YES), the radio-field strength display D1 as shown in FIG. 8 is displayed (step S31 of FIG. 3), instead of the wireless LAN setting button B1, in the first area A1 of the standby screen 71. Since the received radio-field strength is larger than the radio-field strength threshold (S41: NO), the process returns to the step S11 (FIG. 2). In the following, the first loop including steps S11, S13, S31, S33, S35, and S41 is repeated.

Next, an explanation will be made about a case in which the access point 62 is turned off to stop transmission of the radio wave from the access point 62 in a state that the first loop described above is continued. Since the state, in which the received radio-field strength of the wireless LAN communication 203 is smaller than the radio-field strength threshold, continues for not less than the predetermined time period (step S41 of FIG. 3: YES), the redisplay flag 42 is set as "redisplay is performed" (S43), and then the wireless LAN setting flag 41 is set as "not yet set" (S45). Turning back to the flowchart of FIG. 2, since the wireless LAN setting flag 41 is "not yet set" (S13: NO), the wireless LAN setting button B1 is redisplayed in the first area A1 as shown in FIG. 7 (S15). Since the redisplay flag 42 is set as "redisplay is performed" (S19: YES) and since the received radio-field strength is smaller than the radio-field strength threshold (S20: NO), the process returns to the step S11. In the following, the second loop including steps S11, S13, S15, S17, S18, S19, and S20 is repeated. In a case that the access point 62 is again turned on and that the state, in which the received radio-field strength is larger than the radio-field strength threshold, continues for not less than the predetermined time period (S20: YES), the second loop is completed and the wireless LAN setting process (S21) is started.

Figure 10:
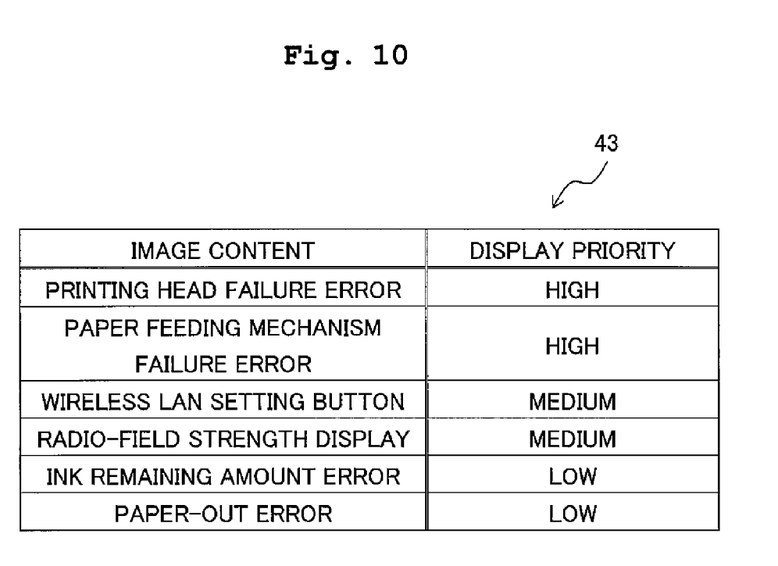
FIG. 10 is an example of a display priority table.

Further, an explanation will be made about a case in which failure of the printing head of the MFP 10 occurs in the state that the first loop described above is repeated. Since the error, which is required to be displayed as the error display, occurs (step S11 of FIG. 2: YES), the process proceeds to the step S51 as shown in FIG. 4. Since the wireless LAN setting flag 41 is "already set" (S51: YES), the process proceeds to the step S63. In the display priority table 43 as shown in FIG. 10, the display priority of the printing head error display is "high" and the display priority of the radio-field strength display D1 is "medium". In this case, since the display priority of the printing head error display is higher than the display priority of the radio-field strength display D1 (S63: YES), the CPU 14 controls the display panel 50 to display the error display D2 of the printing head error in the second area A2 (S65) as shown FIG. 9. In the following, the third loop including steps S33, S35, S41, S11, S51, S63, and S65 is repeated. In a case that the error is cleared (S11: NO), the third loop is completed.

An effect of the MFP 10 according to the first embodiment will be explained. The wireless LAN setting button B1 is the button image for starting the wireless LAN setting process (S21). Further, the radio-field strength display D1 is the image which displays the received radio-field strength of the wireless LAN communication 203 obtained depending on execution or completion of the wireless LAN setting process (S21). Note that the received radio-field strength of the wireless LAN communication 203 can be obtained during executing the wireless LAN setting process (S21). That is, the wireless LAN setting button B1 and the radio-field strength display D1 are images related to each other, but these images do not require to be displayed in the same first area A1 at the same time. Therefore, by performing time-division of the first area A1 before and after the completion of the execution of the wireless LAN setting process (S21), the first area A1 is used as an area in which both of the wireless LAN setting button B1 and the radio-field strength display D1 can be displayed. Accordingly, it is possible to effectively use the display area of the standby screen 71. Further, there is no need to perform a complicated operation for displaying the wireless LAN setting button B1 and the radio-field strength display D1, such as operation of the menu of the tree structure, and thus it is possible to enhance user-friendliness.

Further, the MFP 10 can redisplay the wireless LAN setting button B1 in the first area A1 in the case that the wireless LAN setting is reset (S33: YES). Thus, in a case that the wireless LAN setting is required to be executed again, the wireless LAN setting button B1 can be displayed on the uppermost-level standby screen 71 other than on the menu screen belonging to the lower level of the tree structure. Accordingly, it is possible to start re-execution of the wireless LAN setting easily.

Further, the MFP 10 can redisplay the wireless LAN setting button B1 in the first area A1, in the case that the wired LAN circuit 4 is used instead of the wireless LAN communication 203 (S35: YES). Accordingly, in a case that there is a need to re-execute the wireless LAN setting, such as a case in which the wired LAN circuit 4 is temporarily used due to failure of the access point 62, the re-execution of the wireless LAN setting can be started easily.

Further, the MFP 10 can redisplay the wireless LAN setting button B1 in the first area A1, in the case that the state, in which the received radio-field strength of the wireless LAN communication 203 is smaller than the radio-field strength threshold, continues for not less than the predetermined time period (S41: YES). Accordingly, in the case that there is the need to re-execute the wireless LAN setting, such as a case in which the access point 62 is exchanged, the re-execution of the wireless LAN setting can be started easily.

Further, the MFP 10 displays the radio-field strength display D1 in the first area A1 instead of the wireless LAN setting button B1, in the case that the state, in which the received radio-field strength of the wireless LAN communication 203 is larger than the radio-field strength threshold, continues for not less than the predetermined time period (S20: YES). Accordingly, it is possible to automatically switch images to be displayed in the first area A1 in accordance with the case in which the wireless LAN setting is required or the case in which the radio-field strength display is required. Thus, it is possible to use the first area A1 more effectively.

Further, the MFP 10 can judge, based on the display priority of the error display D2, as to whether or not the error display D2 is displayed in the second area A2 in preference to the wireless LAN setting button B1 or the radio-field strength display D1 (S53, S63). Accordingly, it is possible to use the display area of the standby screen 71 more effectively.

Second Embodiment

Figure 5:
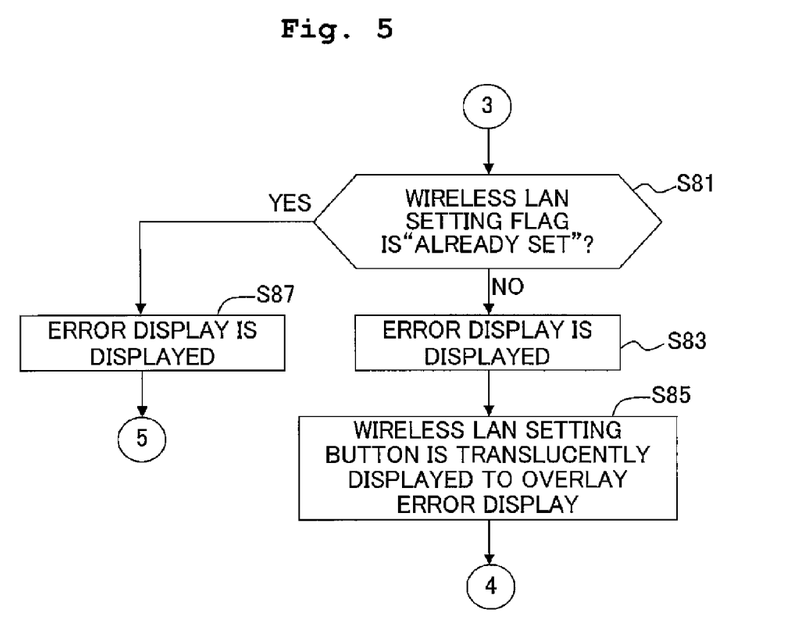
FIG. 5 is the fourth flowchart showing the operation of the multifunction machine.

An explanation will be made with reference to FIG. 5 about the second embodiment of the present teaching. The second embodiment is the first modified embodiment of the flow of the error display in the first embodiment as shown in FIG. 4. In the step S11 as shown FIG. 2, in the case that the error, which is required to be displayed as the error display, occurs in the MFP 10 (S11: YES), the process proceeds to a step S81 (FIG. 5). In the step S81, the CPU 14 judges as to whether or not the wireless LAN setting flag 41 is "already set". In a case that the wireless LAN setting flag 41 is "not yet set" (S81: NO), the process proceeds to a step S83. In the step S83, the error display D2 depending on the error content occurred in the MFP 10 is displayed in the second area A2. Further, in the step S85, the CPU 14 controls the display panel 50 to translucently display the wireless LAN setting button B1 in the first area A1 to overlay the error display D2. Then, the process proceeds to the step S17 as shown in FIG. 2. By doing so, an area, of the error display D2, which is overlaid with the wireless LAN setting button B1 can be seen through the translucent wireless LAN setting button B1. Thus, it is possible to display the wireless LAN setting button B1 and the error display D2 in the first area A1 at the same time, and it is possible to use the display area of the standby screen 71 more effectively.

Further, in the step S81, in a case that the wireless LAN setting flag 41 is "already set" (S81: YES), the process proceeds to a step S87 and the CPU 14 displays the error display D2 in the second area A2. Then, the process proceeds to the step S33 as shown in FIG. 3. Accordingly, only the error display D2 can be displayed in the first area A1.

Third Embodiment

Figure 6:
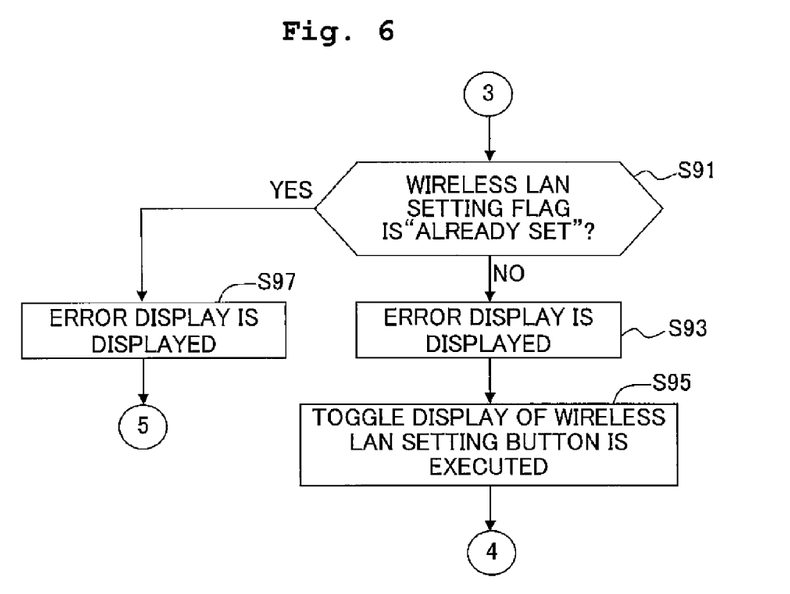
FIG. 6 is the fifth flowchart showing the operation of the multifunction machine.

An explanation will be made with reference to FIG. 6 about the third embodiment of the present teaching. The third embodiment is the second modified embodiment of the flow of the error display in the first embodiment as shown in FIG. 4. In a step S91, the CPU 14 judges as to whether or not the wireless LAN setting flag 41 is "already set". In a case that the wireless LAN setting flag 41 is "not yet set" (S91: NO), the process proceeds to a step S93 and the CPU 14 displays the error display D2 in the second area A2. Further, in a step S95, the CPU 14 displays the wireless LAN setting button B1 in the first area A1 to overlay the error display D2. Then, the CPU 14 executes a toggle display which is a display to alternately switch, on a predetermined time basis, between a state in which the wireless LAN setting button B1 is displayed to overlay the error display D2 and a state in which the wireless LAN setting button B1 is not displayed. Then, the process proceeds to the step S17 as shown in FIG. 2. By doing so, it is possible to display the wireless LAN setting button B1 and the error display D2 in the first area A1 at the same time, and thus it is possible to use the display area of the standby screen 71 more effectively.

Further, in the step S91, in a case that the wireless LAN setting flag 41 is "already set" (S91: YES), the process proceeds to a step S97 and the CPU 14 controls the display panel 50 to display the error display D2 in the second area A2. Then, the process proceeds to the step S33 as shown in FIG. 3. Accordingly, only the error display D2 can be displayed in the first area A1.

Each of the technical elements described in the present description or drawings shows technical usability alone or by various combinations, and the present teaching is not limited to the combinations recited in claims originally filed. Further, techniques exemplified in the present description or drawings achieve a plurality of objects at the same time, and the technical usability is realized if at least one of the objects is achieved. Hereinbelow, modified embodiments will be described.

Modified Embodiment

There are variety of combinations of images, which are related to each other but do not require to be displayed in the same first area A1 at the same time. For example, the combinations may include a combination of a time-setting button image and a time-display image. In this case, the time-setting button is displayed in the first area A1 until the time is set. When the time-setting button is touched, time-setting is started. When the time-setting is completed, a time-display is displayed in the first area A1 instead of the time-setting button.

In the embodiments, the wireless LAN setting button B1 is not displayed in the first area A1, only when the wireless LAN communication 203 is established (S23: YES). However, the present teaching is not limited thereto. For example, irrespective of success and failure of the wireless LAN communication 203, the wireless LAN setting button B1 may not be displayed in the first area A1, in the case that the wireless LAN setting process (S21) is executed.

In the embodiments, the wireless LAN setting button B1 is redisplayed in the first area A1, in the case that the setting content of the wireless LAN setting is reset (S33: YES), that the connection method is switched to the wired LAN circuit 4 from the wireless LAN communication 203 (S35: YES), or that the received radio-field strength is the weak (S41: YES). However, the present teaching is not limited thereto. Also in these cases, the state in which the radio-field strength display D1 is displayed in the first area A1 may be maintained.

Further, the wireless LAN setting button B1 may be redisplayed in the first area A1, only when all of the settings of the MFP 10 are reset to bring the MFP 10 back to a state when shipped from a factory, instead of the case in which the setting content of the wireless LAN setting is reset (S33: YES).

The radio-field strength display D1 may have a function of the wireless LAN setting button B1. In this case, when the radio-field strength display D1 is touched, the wireless LAN setting wizard (S21) is started. Accordingly, in the case that there is the need to re-execute the wireless LAN setting, such as a case in which the access point is switched, the re-execution of the wireless LAN setting can be started easily.

Technical characteristic of the present teaching is that the display area of the display panel 50 is effectively used. Therefore, the range of application of the technique of the present application is not restricted to the MFP 10, and the technique of the present application is applicable to various apparatuses, such as a mobile phone, a smartphone, and a laptop computer, each having the display screen. Further, the technique of the present teaching is not limited to application as the data input device or the communication device; and is applicable as a method for controlling the data input device or the communication device, and as a program for controlling the computer installed in the data input device or the communication device. Such a program can be provided as a storage medium such as CDROM, DVD, and Btu-ray Disc, or as a storage media such as a hard disk installed in the computer.

The various types of information stored in the ROM 16 and/or the NVRAM 40, such as the display priority table 43, may be stored in an external storage device. Various processes may be executed after the various types of information is read from the external storage device and then is temporarily stored in the RAM 30. The external storage device is exemplified by a memory card, an external hard disk, etc.

Noted that the display panel 50 is an example of a coordinate detection display mechanism. The wireless LAN setting button B1 is an example of a first image. The CPU 14 which executes the process of the step S15 is an example of a first display control mechanism. The wireless LAN setting wizard is an example of a predetermined process. The CPU 14 which executes the process of the step S21 is an example of a process executing mechanism. The radio-field strength display D1 is an example of a data image. The CPU 14 which executes the process of the step S31 is an example of a second display control mechanism. The display panel 50 and the CPU 14 are examples of the data input device or the communication device. The wireless LAN setting is an example of a processing result. The CPU 14 which executes the processes of the steps S45 and S15 is an example of a third display control mechanism. The wireless LAN communication 203 is an example of wireless communication. The wired LAN circuit 4 is an example of wire or cable communication. The access point 62 is an example of a wireless base station. The error display D2 is an example of a second image.

What is claimed is:

1. A multi-function peripheral which is communicable with an external device, comprising:

a printer section configured to print an image onto a medium;
a touch screen display configured to detect an indicated position on the touch screen display and to display a plurality of kinds of objects at the same time;
a controller configured to:
  control the touch screen display to define at least one first area in the touch screen display, wherein the first area is configured to display one of a first object, which is in relation to executing a setting process of communication, and a second object, which is in relation to data obtained depending on execution or completion of the setting process of communication,
  control the touch screen display to display the first object in the first area and another object in another area except for the first area,
  in response to a detection of the indicated position in the first area, execute the setting process of communication in a case that the first object is displayed in the first area and that the indicated position detected by the touch screen display is located in the first area; and
  control the touch screen display to continue to display the another object in the another area, and display the second object, in the first area, instead of the first object, in a case that execution of the setting process of communication is completed: and
wherein the first area is configured to display one of the first object, the second object, and a third object, wherein the third object comprises an error display message; in response to a detection of an error, and based on a determination that a priority of the error is higher than a priority of the first and second objects, at least a portion of the third object is displayed in the first area instead of the first object or the second object; and
  in response to the detection of the error, and based on a determination that the priority of the error is lower than the priority of the first and second objects, the first object or the second object continues to be displayed in the first area.

2. The multi-function peripheral according to claim 1, wherein the controller is configured to control the touch screen display to redisplay the first object in the first area instead of the second object, in a case that a processing result obtained by the execution of the setting process of communication is reset.

3. The multi-function peripheral according to claim 2, wherein the setting process of communication includes a setting process of wireless communication between the communication device and a specific wireless base station as the external device; and
the controller is configured to control the touch screen display to redisplay the first object in the first area instead of the second object, in a case that radio-field strength of the specific wireless base station is smaller than a threshold.

4. The multi-function peripheral according to claim 3, wherein the controller is configured to control the touch screen display to display the second object in the first area instead of the first object, in a case that the first object is redisplayed in the first area due to a situation that the radio-field strength of the specific wireless base station is greater than the threshold.

5. The multi-function peripheral according to claim 1, wherein the setting process of communication includes a setting process of wireless communication between the communication device and the external device; and the controller is configured to control the touch screen display to redisplay the first object in the first area instead of the second object, in a case that wired communication is used instead of the wireless communication.

6. The multi-function peripheral according to claim 5, wherein the setting process of communication includes a setting process of wireless communication between the communication device and a specific wireless base station as the external device; and
the controller is configured to control the touch screen display to redisplay the first object in the first area instead of the second object, in a case that radio-field strength of the specific wireless base station is smaller than a threshold.

7. The multi-function peripheral according to claim 6, wherein the controller is configured to control the touch screen display to display the second object in the first area instead of the first object, in a case that the first object is redisplayed in the first area due to a situation that the radio-field strength of the specific wireless base station is greater than the threshold.

8. The multi-function peripheral according to claim 1, wherein the controller is configured to control the touch screen display to define a second area, which is overlapped with at least a part of the first area, in the touch screen display and to control the touch screen display to display a third object in the second area; and
the controller is configured to control the touch screen display to delete the first object from the first area and display the third object in the second area in preference to the first object, in a case that priority of the third object is higher than priority of the first object, and to control the touch screen display to delete the second object from the first area and display the third object in the second area in preference to the second object, in a case that the priority of the third object is higher than priority of the second object.

9. The multi-function peripheral according to claim 8, wherein the third object is an image indicating an error occurred in the communication device.

10. The multi-function peripheral according to claim 1, wherein the setting process of communication includes a setting process of wireless communication between the communication device and the external device, and
the first object is an image indicating data relating to a situation before the setting process of wireless communication.

11. The multi-function peripheral according to claim 1, wherein the setting process of communication includes a setting process of wireless communication between the communication device and the external device, and
the second object is an image indicating data obtained depending on execution or completion of the setting process of wireless communication.

12. The multi-function peripheral according to claim 1, wherein the setting process of communication is a wireless communication setting process between the communication device and a specific wireless base station as the external device, and
the controller is configured to:
control the touch screen display to display the first object in the first area, before the wireless communication setting process is performed, and
control the touch screen display to display an image regarding a radio-field strength of the specific wireless base station at the communication device in the first area as the second object, under a condition that the wireless communication setting process is completed.

13. The multi-function peripheral according to claim 1:
wherein the first area is configured to display one of the first object, the second object, and a third object; and
in response to a detection of an error, display at least a portion of the third object in the first area, wherein the third object comprises an error display message; and
in response to fixing the error, control the touch screen display to delete the third object from the first area and display one of the first object and the second object.

14. The multi-function peripheral according to claim 1, wherein the printer section includes a printing head and a feeding mechanism configured to feed the medium toward the printing head,
under a condition that the error is due to the printing head or the feeding mechanism, the priority of the error is determined to be higher than the priority of the first and second objects, and
under a condition that the error is due to a lack of expendables used by the printer section, the priority of the error is determined to be lower than the priority of the first and second objects.

15. A method for controlling a multi-function peripheral, the multi-function peripheral including a printer section configured to print an image onto a medium and a touch screen display configured to detect an indication received on the touch screen display and to display a plurality of objects; and
a controller configured to perform a wireless communication setting process in response to a detection of the indication, the method comprising:
defining a first area in the touch screen display, wherein the first area is configured to display one of a first object, which is in relation to executing the wireless communication setting process, a second object, which is in relation to data obtained depending on execution or completion of the wireless communication setting process, and a third object, wherein the third object comprises an error display message;
in response to a detection of an indication in the first area, executing the wireless communication setting process in a case that the indication detected by the touch screen display is located in the first area;
in response to completing execution of the wireless communication setting process, displaying, in the first area, the second object instead of the first object; and
in response to a detection of an error, and based on a determination that a priority of the error is higher than a priority of the first and second objects, at least a portion of the third object is displayed in the first area instead of the first object or the second object; and
in response to the detection of the error, and based on a determination that the priority of the error is lower than the priority of the first and second objects, the first object or the second object continues to be displayed in the first area.

16. A non-transitory computer readable medium storing a program for a multi-function peripheral, the multi-function peripheral including a printer section configured to print an image onto a medium and a touch screen display configured to detect an indication and to display a plurality of objects, and a controller configured to perform a wireless communication setting process in response to a detection of the indication detected by the touch screen display, wherein the program is configured so that the controller in the communication device functions as:

a first display control mechanism configured to control the touch screen display to define a first area in the touch screen display, wherein the first area is configured to display one of a first object, which is in relation to executing the wireless communication setting process, and a second object, which is in relation to data obtained depending on execution or completion of the setting process of communication;

a process executing mechanism configured to execute the wireless communication setting process in a case that the indication detected by the touch screen display is located in the first area displaying the first object;

a second display control mechanism configured to control the touch screen display to display the second object instead of the first object in a case that execution of the wireless communication setting process is completed; and a third display control mechanism configured to, in response to a detection of an error, and based on a determination that a priority of the error is higher than a priority of the first and second objects, at least a portion of the third object is displayed in the first area instead of the first object or the second object; and wherein the third display control mechanism is further configured to, in response to the detection of the error, and based on a determination that the priority of the error is lower than the priority of the first and second objects, continue to display the first object or the second object in the first area.

17. A communication device which is communicable with an external device, comprising:

a touch screen display configured to detect an indicated position on the touch screen display and to display a plurality of kinds of objects at the same time;

a controller configured to:

control the touch screen display to define at least one first area in the touch screen display, wherein the first area is configured to display one of a first object, which is in relation to executing a setting process of communication, and a second object, which is in relation to data obtained depending on execution or completion of the setting process of communication, control the touch screen display to display the first object in the first area and another object in another area except for the first area, in response to a detection of the indicated position in the first area, execute the setting process of communication in a case that the first object is displayed in the first area and that the indicated position detected by the touch screen display is located in the first area; and control the touch screen display to continue to display the another object in the another area, and display the second object, in the first area, instead of the first object, in a case that execution of the setting process of communication is completed, wherein the setting process of communication includes a setting process of wireless communication between the communication device and a specific wireless base station as the external device; and the controller is configured to control the touch screen display to redisplay the first object in the first area instead of the second object, in a case that radio-field strength of the specific wireless base station is smaller than a threshold, for a fixed period.

* * * * *